United States Patent [19]
Doose et al.

[11] Patent Number: 5,921,495
[45] Date of Patent: Jul. 13, 1999

[54] HOUSING FOR A SAFETY BELT DEVICE

[75] Inventors: Wolfgang Doose, Wakendorf II; Erhard Ender, Hadenfeld; Karl-Warner Füchsel, Hamburg, all of Germany

[73] Assignee: Autoliv Development AB, Vargarda, Sweden

[21] Appl. No.: 09/023,316

[22] Filed: Feb. 13, 1998

[30] Foreign Application Priority Data

Feb. 15, 1997 [DE] Germany ............... 197 05 881

[51] Int. Cl.$^6$ ............................................. B60R 22/34
[52] U.S. Cl. ............................................. 242/379
[58] Field of Search .................. 242/379, 379.1, 242/382–384.7; 280/806, 807; 297/475, 476, 477, 478; 29/438, 521; 72/379.2

[56] References Cited

U.S. PATENT DOCUMENTS

| | | | |
|---|---|---|---|
| 4,531,687 | 7/1985 | Andersson | 242/383.5 |
| 4,984,752 | 1/1991 | Marrs et al. | 242/379 |
| 5,443,223 | 8/1995 | Yosin et al. | 242/379 |
| 5,524,833 | 6/1996 | Modinger et al. | 242/382.6 |
| 5,687,926 | 11/1997 | Park et al. | 242/383.4 |

FOREIGN PATENT DOCUMENTS

| | | |
|---|---|---|
| 3203502 | 8/1983 | Germany . |
| 3239584 | 4/1984 | Germany . |
| 3402245 | 7/1985 | Germany . |
| 3532470 | 3/1986 | Germany . |
| 19541449 | 5/1996 | Germany . |
| 19504506 | 8/1996 | Germany . |

*Primary Examiner*—John M. Jillions
*Attorney, Agent, or Firm*—Robert W. Becker & Associates

[57] ABSTRACT

A housing for a safety belt device has a U-shaped base body consisting of a single stamped housing blank folded to form a base, two legs, and a spacer portion attached to each one of the legs. The spacer portions are folded toward one another and connected to one another to form a spacer stay connecting the two legs.

6 Claims, 4 Drawing Sheets

HOUSING FOR A SAFETY BELT DEVICE

BACKGROUND OF THE INVENTION

The present invention relates to a housing for a safety belt device such as a safety belt reeling device, comprised of a U-shaped base body and a separate spacer stay for connecting the legs of the U-shaped base body. The U-shaped base body is formed of a unitary stamped blank by bending the two lateral parts of the stamped blank to form the legs of the U-shaped base body.

A housing with the aforementioned features is known from German Patent 32 39 584. Such a housing, however, has the disadvantage that the two legs of the U-shaped housing must be provided with a separate spacer stay that is to be manufactured by a separate tool and subsequently must be manually or automatically attached to the prepared U-shaped housing in additional method steps.

It is therefore an object of the present invention to embody a housing of the aforementioned kind such that the shaping and manufacture of the housing is simplified.

SUMMARY OF THE INVENTION

The housing of the present invention for a safety belt device is primarily characterized by:
- A U-shaped base body consisting of a single stamped sheet housing blank folded to form a base, two legs, and a spacer portion attached to each one of the legs;
- The spacer portions folded toward one another and connected to one another to form a spacer stay connecting the two legs.

Preferably, the spacer portions have positive-locking ends engaging one another for forming the spacer stay.

Advantageously, the spacer portions are symmetrical to a center line of the single stamped housing blank.

Preferably, the spacer portions at the single stamped housing blank are positioned off center by a spacing relative to a nominal orientation determined by an ideal connecting line of the spacer portions.

The spacer portions are S-shaped in a longitudinal direction thereof.

Along the folding line between the legs and the spacer portions a cutout is provided as a material weakness.

The basic principle of the present invention is that a respective portion of the spacer stay is a unitary part of the leg portions of the stamped blank to be folded into the U-shaped housing and that the spacer stay is then formed by folding the two spacer portions connected to the legs of the U-shaped base body toward one another and connecting them.

The present invention has the advantage that the entire housing can be produced, without additional individual parts being required, in a single stamping process as a flat stamped blank from a continuous material strip that is continuously fed into a stamping tool so that the manufacture of separate individual components such as the spacer stay is eliminated. For completing the manufacture of the housing subsequent to the stamping process, it is only necessary to fold the lateral leg parts into the the U-shape of the housing and to subsequently fold the spacer portions extending from the legs toward one another. The two spacer portions are then connected by wedging etc. to form a permanent connection. The inventive design of the housing results in a high precision for its manufacture as well as its assembly and also allows for automatization. Advantageously, an optimization of the material use is possible because the spacer portions are positioned substantially in areas which otherwise would produce waste material in the stamping process of the continuously produced stamped housing blank. No additional material must therefore be provided for the unitary embodiment of the spacer stay as part of the housing.

According to one embodiment of the invention, it is suggested that the two spacer portions that are provided as a unitary part of the lateral leg portions of the stamped housing blank are provided at their free ends with a positive-locking member for engaging one another and for forming a permanent connection with one another, whereby preferably the permanent connection between the spacer portions is produced by interlocking or wedging over.

According to a first embodiment of the invention the spacer portions forming a unitary part to the lateral leg portions of the stamped housing blank are stamped so as to be symmetrical to the center line of the stamped housing blank.

In order to reduce the amount of waste material during stamping of the housing blank, it is suggested to reduce the amount of lateral projection of the spacer portions past the lateral leg portions of the housing blank such that the spacer portions are positioned somewhat off center from the nominal orientation that is determined by the ideal connecting line of the spacer portions, i.e., they are displaced toward the center line of the stamped blank. A bending step is then performed before assembling the housing so that the slightly inwardly bent spacer portions are bent outwardly in order to assume the nominal (straight) orientation for connecting the spacer portions.

In the alternative, it may be provided that the stamped spacer portions are S-shaped along their longitudinal axes. Due to the S-shaped design of the spacer portions the subsequent bending step and wedging or interlocking step results in a slightly displaced center position of the produced spacer stay.

In order to facilitate folding of the spacer portions relative to the legs of the U-shaped housing, according to one embodiment of the invention it is suggested that along the folding line or folding edge between the spacer portions and the legs of the U-shaped housing a material weakness is provided that is in the form of a cutout.

BRIEF DESCRIPTION OF THE DRAWINGS

The object and advantages of the present invention will appear more clearly from the following specification in conjunction with the accompanying drawings, in which.

DESCRIPTION OF PREFERRED EMBODIMENTS

The present invention will now be described in detail with the aid of several specific embodiments utilizing FIGS. 1 through 7.

Figure 3:
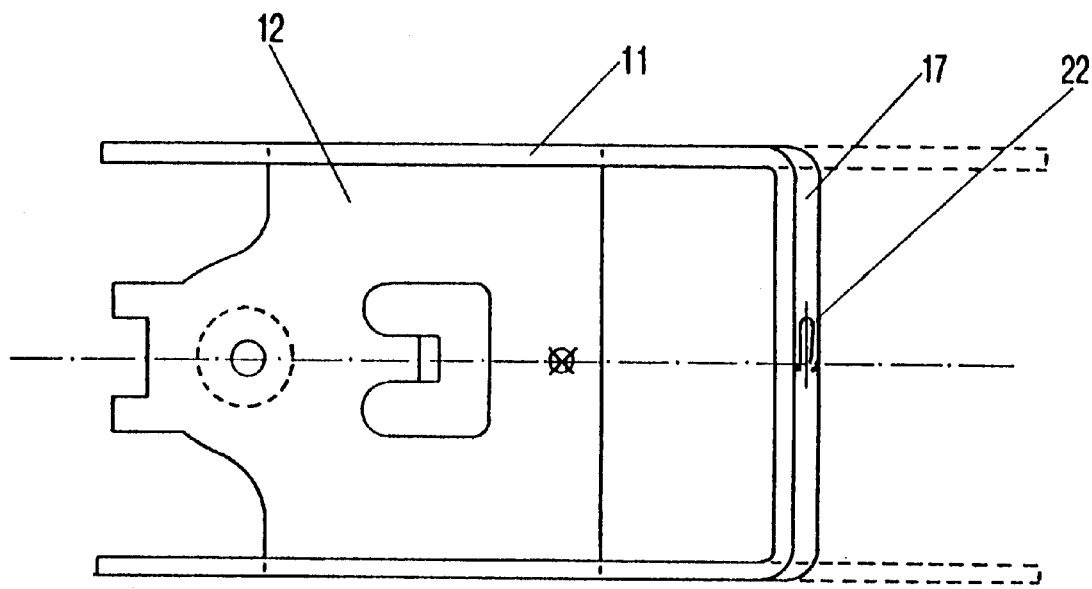
FIG. 3 shows a plan view of the finished housing.
Figure 4:
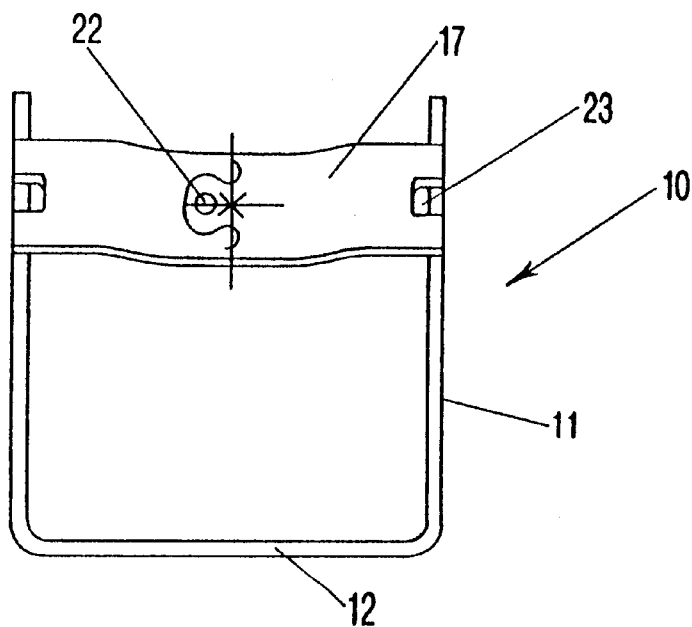
FIG. 4 shows the housing according to FIG. 3 in a front view onto the housing side provided with the spacer stay.

The complete housing 10 shown in FIGS. 3 and 4 has a U-shape with a base 12 and legs 11.

Figure 1:
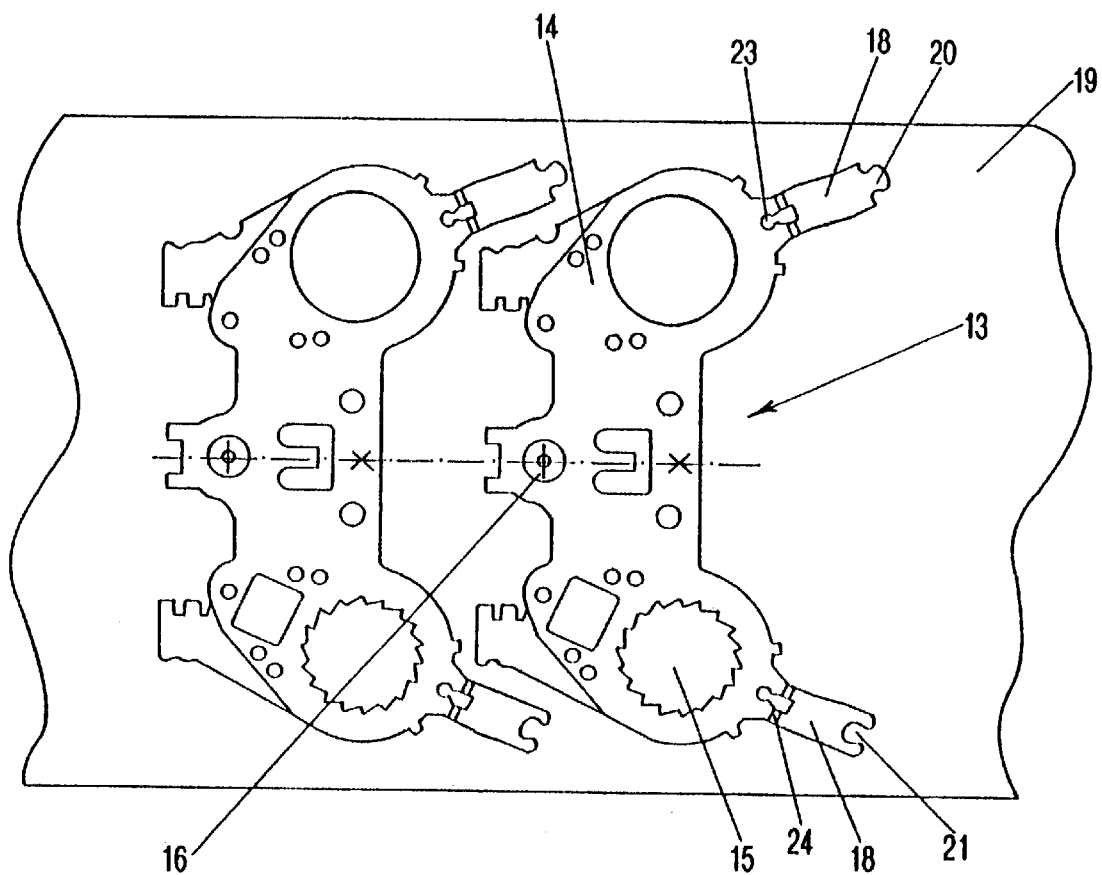
FIG. 1 shows two housing blanks stamped sequentially from a continuous material strip.
Figure 2:
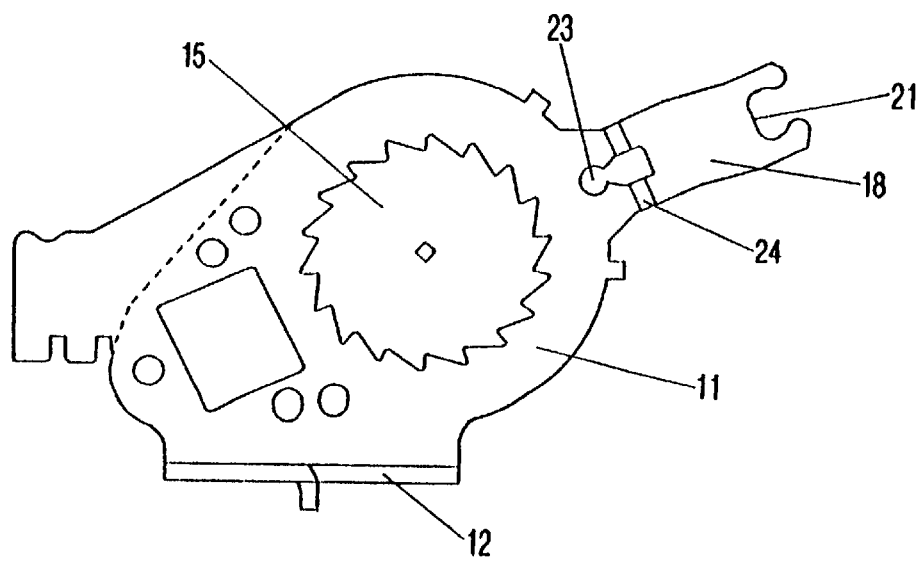
FIG. 2 is a side view of the U-shaped housing with folded legs, with the spacer portions still extending straight relative to the legs.

As can be seen in FIG. 1, the housing 10 before being folded to a U-shaped base body is comprised of a stamped housing blank 13 that is stamped from a continuous material strip 19 which includes lateral leg portions 14 that, after folding of the base body, form the legs of the housing. The lateral leg portions 14 are provided with bearing openings 15 for supporting a non-represented shaft of the safety belt reeling device. The base 12 of the base body is provided by the center portion of the stamped housing blank 13 and has fastening means for fastening the housing 10 to a stationary part of the vehicle.

For forming the spacer stay 17 of the finished housing 10 shown in FIGS. 3 and 4, spacer portions 18 are provided at the lateral leg portions 14 of the housing blank 13. The spacer portions 18 are simultaneously stamped from the continuous material strip 19 so as to be a unitary part of the stamped housing blank. The free end of the spacer portion 18 is provided with a projection 20 and the other spacer portion 18 of the same housing blank 13 is provided at its free end with a cutout 21 that matches the shape of the projection 20. When folding the housing, the projection 20 and the cutout 21 of the two spacer portions 18 are inserted into one another and wedged or interlocked to form a permanent connection. The resulting permanent connection is indicated in FIGS. 3 and 4 with reference numeral 22. In order to facilitate the folding of the spacer portions 18, in the area of the folding edge 24 cutouts 23 as material weakness portions are provided.

Figure 5:
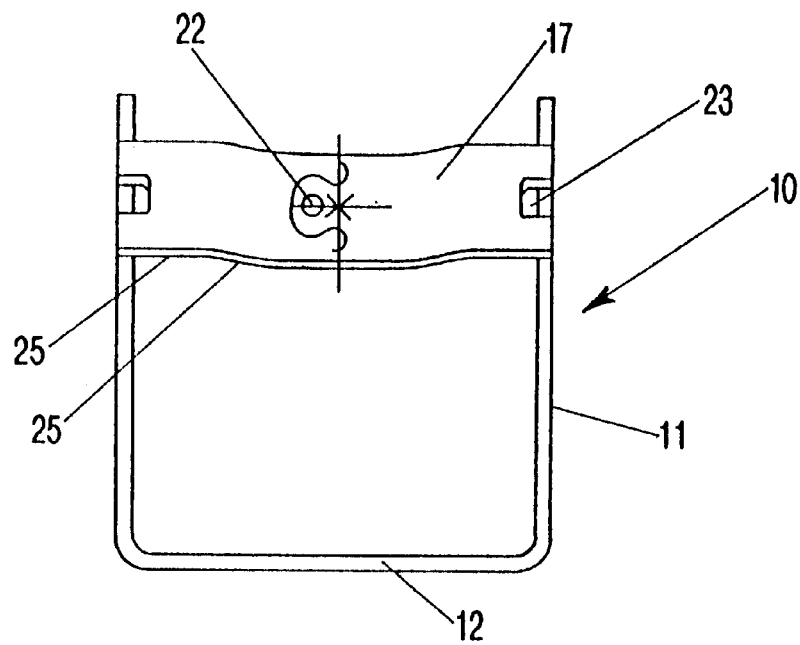
FIG. 5 the housing according to FIG. 4 with S-shaped spacer portions.
Figure 6:
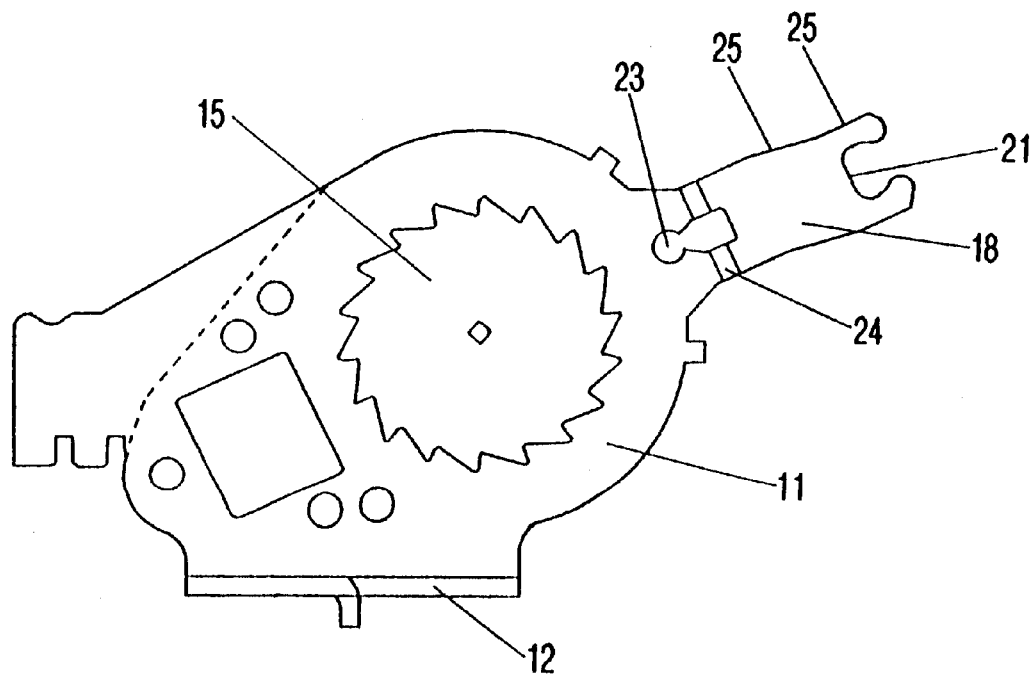
FIG. 6 a side view of the housing represented in FIG. 5 in a representation according to FIG. 2.
Figure 7:
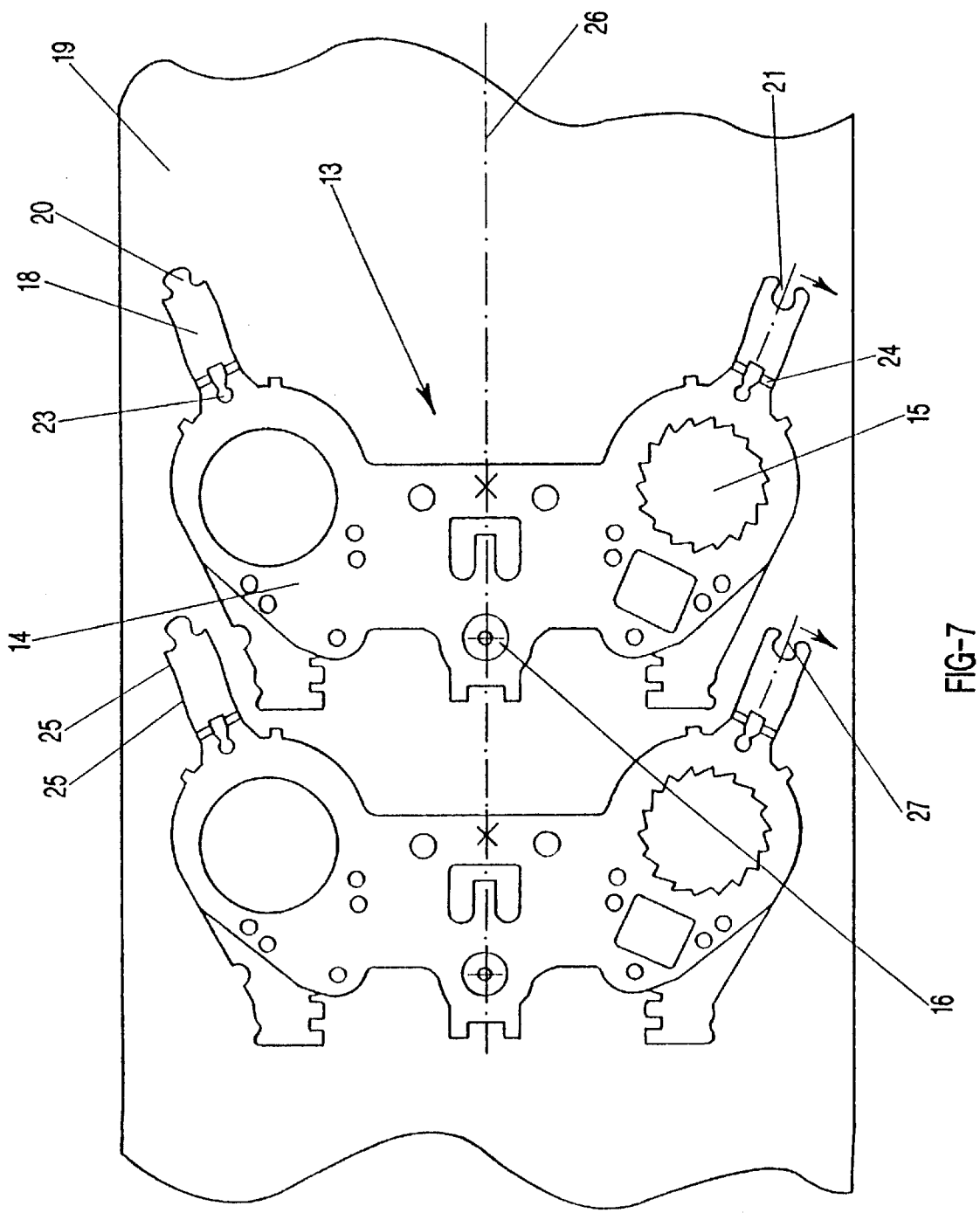
FIG. 7 the housing blank for the housing represented in FIG. 5.

As shown in FIGS. 5 through 7, further measures are possible, e.g., as an alternative the spacer portions 18 can be stamped with a portion 27 that is slightly bent relative to the center line 26 of the housing blank 13 (see FIG. 7) whereby, before assembly of the housing, 10 the spacer portions 18 are bent to a straight position. In another alternative, a slight S-shape 25 is provided, possibly in conjunction with the bent portion 27 of the spacer portions 18, which after bending and wedging of the spacer portions 18, results in a slight displacement of the center position of the spacer stay 17.

The specification incorporates by reference the disclosure of German priority document 197 05 881.7 of Feb. 15, 1997.

The present invention is, of course, in no way restricted to the specific disclosure of the specification and drawings, but also encompasses any modifications within the scope of the appended claims.

What is claimed is:

1. A housing for a safety belt device, said housing comprising:

a U-shaped base body consisting of a single stamped housing blank folded to form a base, two legs, and a spacer portion attached to each one of said legs;

said spacer portions folded toward one another and connected to one another to form a spacer stay connecting said two legs.

2. A housing according to claim 1, wherein said spacer portions have positive-locking ends engaging one another for forming said spacer stay.

3. A housing according to claim 1, wherein said spacer portions are symmetrical to a center line of said single stamped housing blank.

4. A housing according to claim 3, wherein said spacer portions at said single stamped housing blank are positioned off-center by a spacing relative to a nominal orientation determined by an ideal connecting line of said spacer portions.

5. A housing according to claim 1, wherein said spacer portions are S-shaped in a longitudinal direction thereof.

6. A housing according to claim 1, wherein along a folding line between said legs and said spacer portions a cutout is provided as a material weakness.

* * * * *